United States Patent
Kiani et al.

(10) Patent No.: US 12,301,320 B2
(45) Date of Patent: May 13, 2025

(54) METHOD AND SYSTEM FOR UNSUPERVISED USER CLUSTERING AND POWER ALLOCATION IN NON-ORTHOGONAL MULTIPLE ACCESS (NOMA)-AIDED MASSIVE MULTIPLE INPUT-MULTIPLE OUTPUT (MIMO) NETWORKS

(71) Applicant: Telefonaktiebolaget LM Ericsson (publ), Stockholm (SE)

(72) Inventors: Sharareh Kiani, Ajaz (CA); Shahram Shahbazpanahi, Whitby (CA); Majid Bavand, Ottawa (CA); Gary Boudreau, Kanata (CA); Min Dong, Whitby (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 18/252,096

(22) PCT Filed: Dec. 1, 2021

(86) PCT No.: PCT/IB2021/061196
§ 371 (c)(1),
(2) Date: May 8, 2023

(87) PCT Pub. No.: WO2022/118223
PCT Pub. Date: Jun. 9, 2022

(65) Prior Publication Data
US 2023/0412220 A1    Dec. 21, 2023

Related U.S. Application Data

(60) Provisional application No. 63/120,138, filed on Dec. 1, 2020.

(51) Int. Cl.
*H04K 1/10* (2006.01)
*H04B 7/06* (2006.01)
(Continued)

(52) U.S. Cl.
CPC ......... *H04B 7/0617* (2013.01); *H04B 7/0626* (2013.01); *H04W 52/346* (2013.01); *H04W 52/42* (2013.01)

(58) Field of Classification Search
CPC .. H04B 7/0617; H04B 7/0626; H04B 7/0452; H04W 52/346; H04W 52/42
(Continued)

(56) References Cited

U.S. PATENT DOCUMENTS

2014/0314006 A1\* 10/2014 Suh ................. H04B 7/0452
                                                     370/329
2023/0041216 A1\* 2/2023 Lu .................. H04B 7/0426

OTHER PUBLICATIONS

International Search Report and Written Opinion dated Mar. 14, 2022 issued in PCT Application No. PCT/IB2021/061196 filed Dec. 1, 2021, consisting of 16 pages.
(Continued)

*Primary Examiner* — Phuong Phu
(74) *Attorney, Agent, or Firm* — Sonoda & Kobayashi Intellectual Property Law; Sarvajit S. Patil (57) ABSTRACT

Embodiments of a method and network node for managing wireless devices (WDs) in a network are disclosed. In some embodiments, the method comprises grouping the plurality of WDs into clusters based at least in part on correlations between channels of the WDs. The method also includes determining beam forming weights for each cluster, the grouping into clusters and the determining of beam forming weights being performed to minimize a total transmit power to the plurality of WDs.

21 Claims, 7 Drawing Sheets

(51) Int. Cl.
H04L 27/28 (2006.01)
H04W 52/34 (2009.01)
H04W 52/42 (2009.01)

(58) Field of Classification Search
USPC .............. 375/260, 219, 220, 346, 284, 285
See application file for complete search history.

(56) References Cited

OTHER PUBLICATIONS

Jingjin Cui, Unsupervised Machine Learning-Based User Clustering in Millimeter-Wave-NOMA Systems; IEEE Transaction on Wireless Communications, vol. 17, No. 11, Nov. 2018, consisting of 16 pages.

Haijun Zhang, Energy Efficient User Clustering, Hybrid Precoding annd Power Optimization in Terahertz MIMO-NOMA Systems; Cornell University Library, May 2020, consisting of 11 pages.

Xiaoming Chen et al., Fully Non-Orthogonal Communication for Massive Access; IEEE Transactions on Communications, vol. 66, No. 4, Apr. 2018, consisting of 15 pages.

S. Kusaladharma et al., Achievable Rate Analysis of NOMA in Cell-free Massive MIMO: A Stochastic Geometry Approach; IEEE International Conference on Communications (ICC), 2019, consisting of 6 pages.

3GPP TS 23.501 V15.2.0 (Jun. 2018) 3rd Generation Partnership Project; Technical Specification Group Services and System Aspects; System Architecture for the 5G System; Stage 2 (Release 15), consisting of 217 pages.

3GPP TS 38.211 V15.1.0 (Mar. 2018) 3rd Generation Partnership Project; Technical Specification Group Radio Access Network; NR; Physical channels and modulation (Release 15), consisting of 90 pages.

3GPP TS 38.214 V15.1.0 (Mar. 2018) 3rd Generation Partnership Project; Technical Specification Group Radio Access Network; NR; Physical layer procedures for data (Release 15), consisting of 77 pages.

* cited by examiner

FIG. 7

METHOD AND SYSTEM FOR UNSUPERVISED USER CLUSTERING AND POWER ALLOCATION IN NON-ORTHOGONAL MULTIPLE ACCESS (NOMA)-AIDED MASSIVE MULTIPLE INPUT-MULTIPLE OUTPUT (MIMO) NETWORKS

CROSS-REFERENCE TO RELATED APPLICATIONS

This application is a Submission Under 35 U.S.C. § 371 for U.S. National Stage Patent Application of International Application No.: PCT/IB2021/061196, filed Dec. 1, 2021 entitled "METHOD AND SYSTEM FOR UNSUPERVISED USER CLUSTERING AND POWER ALLOCATION IN NON-ORTHOGONAL MULTIPLE ACCESS (NOMA)-AIDED MASSIVE MULTIPLE INPUT-MULTIPLE OUTPUT (MIMO) NETWORKS," which claims priority to U.S. Provisional Application No. 63/120,138, filed Dec. 1, 2020, entitled "METHOD AND SYSTEM FOR UNSUPERVISED USER CLUSTERING AND POWER ALLOCATION IN NOMA-AIDED MASSIVE MIMO NETWORKS," the entireties of both of which are incorporated herein by reference.

TECHNICAL FIELD

The present disclosure relates to network management and in particular to a method and system for unsupervised user clustering and power allocation in non-orthogonal multiple access (NOMA)-aided massive multiple input-multiple output (MIMO) networks.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Some conventional wireless networks use orthogonal multiple access (OMA) schemes to serve wireless devices (WDs) by assigning an exclusive orthogonal resource block to each WD to avoid inter-WD interference. Employing OMA alone will likely be insufficient to meet the target requirements of future generations of cellular networks to provide massive connectivity and high spectral efficiency in ultra-dense network applications such as the Internet of things (IoT). Non-orthogonal multiple access (NOMA), on the other hand, has proved to be an efficient technique to reduce transmission latency and support massive connectivity by allocating non-orthogonal resources to WDs. Multiplexing in NOMA can be performed in either a code-domain space where sparse or non-orthogonal spreading sequences are used, or in the power-domain where different power levels are assigned to different WDs scheduled on the same frequency resource blocks.

Another aspect of massive connectivity in 5G networks and beyond, is the massive multi-input multi-output (MIMO) technology offering high spectral efficiency as well as high spatial resolution for WD multiplexing. In massive MIMO networks, the base station (BS) (also referred to herein as a network node) is typically equipped with a large number of antennas. These antennas can be arranged in the network in a co-located or distributed fashion. The former architecture, denoted as a co-located massive MIMO includes a single network node equipped with a large-scale antenna array. The latter setup, denoted as distributed massive MIMO, consists of multiple distributed single-antenna access points (APs), which are connected through a coordinating central processing unit (CPU)

The integration of NOMA schemes into massive MIMO networks is a possible combination for future generations of cellular networks. However, there is currently no comprehensive WD clustering solution proposed for using NOMA in both co-located and distributed massive MIMO systems. Moreover, existing solutions do not take into account the effects of channel correlations among WDs. The integration of power domain NOMA into co-located massive millimeter-wave MIMO systems is studied in X. Chen, Z. Zhang, C. Zhong and R. Jia, "Fully Non-Orthogonal Communication for Massive Access," IEEE Transactions on Communications, vol. 66, no. 4, pp. 1717-1731, 2018, where the WDs are grouped into separate clusters based on their spatial direction information, and successive interference cancellation (SIC) operations are employed by WDs to mitigate the intra-cluster interference within each cluster. J. Cui, Z. Ding, P. Fan and a. N. Al-Dhahir, in "Unsupervised machine learning-based WD clustering in millimeter-wave-NOMA systems," IEEE Transactions on Wireless Communications, vol. 17, no. 11, pp. 7425-7440, 2018 addresses the problem of power allocation and WD clustering in co-located millimeter-wave NOMA downlink transmissions by maximizing the sum-rate under the rate requirements and the total transmit power constraints. In particular, using Euclidean distance as a measure of channel correlation between the WDs and a multi-antenna network node, a machine-learning-based K-means algorithm has been proposed to group those WDs that are physically close to each other into one cluster. For distributed massive MIMO networks, W.-P. Zhu, W. Ajib, G. Amarasuriya and a. S. Kusaladharma., "Achievable rate analysis of NOMA in cell-free massive MIMO: A stochastic geometry approach," in ICC 2019-2019 IEEE International Conference on Communications (ICC), 2019 considered a WD pairing scheme and studied the application of NOMA on improving the throughput of the network With multi-antenna transmitters, the spatial dimension can be explored to separate data from different WDs. However, in co-located deployments or for WDs in proximity to each other, the channels of the WDs may be highly correlated. This limits the degrees of freedom that can be explored at the transmitters to eliminate interference among WDs. As a result, only relying on spatial dimensions via transmit beamforming to separate WDs may result in poor performance. To address this, for WDs with highly correlated channels, NOMA techniques may be employed to group them in the same cluster and use the power dimension to separate their data.

In light of finite power and spectrum resources, NOMA is considered to be highly beneficial to support massive connectivity for 5G networks and beyond. To integrate NOMA into massive MIMO systems, WDs are usually grouped into several clusters based on some predefined criteria, and each cluster is served on a separate resource block. However, current NOMA clustering solutions are not applicable to be used on both co-located and distributed massive MIMO systems, and for a correlated environment.

SUMMARY

Methods and network nodes for managing wireless devices (WDs) in a network are disclosed. In some embodiments, a method comprises grouping WDs into clusters based at least in part on correlation characteristics of WD channels; computing respective beamforming weights for each cluster; and allocating, to each WD within a given cluster, a transmit power level based at least in part on the computed beamforming weights.

According to one aspect, a method in a network node configured to communicate wirelessly with a plurality of wireless devices, WDs includes: grouping the plurality of WDs into clusters based at least in part on correlations between channels of the WDs; and determining beam forming weights for each cluster, the grouping into clusters and the determining of beam forming weights being performed to minimize a total transmit power to the plurality of WDs.

According to this aspect, in some embodiments, the method also includes determining a power allocated to each WD of the plurality of WDs that minimizes the total transmit power. In some embodiments, the grouping of the plurality of WDs into clusters is performed by an unsupervised machine learning process. In some embodiments, the unsupervised machine learning process is configured to maximize a total number of users in each group cluster based at least in part on the correlations. In some embodiments, the unsupervised machine learning process includes a mean-shift algorithm. In some embodiments, the correlations between the channels are derived from channel state information, CSI, that is one of reported by the plurality of WDs and estimated by the network node.

In some embodiments, beam forming weights for a cluster are determined based at least in part on a centroid of a function of channel state information, CSI, for the WDs in the cluster. In some embodiments, beam forming weights for a cluster are determined based at least in part on a zero-forcing process. In some embodiments, the method also includes allocating power to WDs within a cluster by application of a non-orthogonal multiple access, NOMA, sequential interference cancellation, SIC, process. In some embodiments, the grouping of the plurality of WDs into clusters and the allocating of power to the WDs within a cluster are performed subject to constraints on signal to interference plus noise ratios, SINRs, measured at each WD of the plurality of WDs. In some embodiments, the grouping into clusters and the determining of beam forming weights for each cluster is performed in a distributed massive multiple input multiple output, MIMO, non-orthogonal multiple access, NOMA, architecture. In some embodiments, the grouping into clusters and the determining of beam forming weights for each cluster is performed in a collocated massive multiple input multiple output, MIMO, non-orthogonal multiple access, NOMA, architecture.

According to another aspect, a network node is configured to communicate wirelessly with a plurality of wireless devices, WDs. The network node includes processing circuitry configured to: group the plurality of WDs into clusters based at least in part on correlations between channels of the WDs; and determine beam forming weights for each cluster, the grouping into clusters and the determining of beam forming weights being performed to minimize a total transmit power to the plurality of WDs.

According to this aspect, in some embodiments, the processing circuitry is further configured to determine a power allocated to each WD of the plurality of WDs that minimizes the total transmit power. In some embodiments, the grouping of the plurality of WDs into clusters is performed by an unsupervised machine learning process. In some embodiments, the unsupervised machine learning process is configured to minimize the total transmit power to the plurality of WDs. In some embodiments, the unsupervised machine learning process includes a mean-shift algorithm. In some embodiments, the correlations between the channels are derived from channel state information, CSI, reported by the plurality of WDs.

In some embodiments, beam forming weights for a cluster are determined based at least in part on a centroid of the cluster. In some embodiments, beam forming weights for a cluster are determined based at least in part on a zero-forcing process. In some embodiments, the processing circuitry is further configured to allocate power to WDs within a cluster by application of a non-orthogonal multiple access, NOMA, sequential interference cancellation, SIC, process. In some embodiments, the grouping of the plurality of WDs into clusters and the allocating of power to the WDs within a cluster are performed subject to constraints on signal to interference plus noise ratios, SINRs, measured at each WD of the plurality of WDs.

Embodiments of a network node, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

To fully exploit the benefits of NOMA in a correlated propagation environment, the system needs an elaborate design of the clustering method such that highly correlated WDs can be grouped into the same clusters. However, current studies have only considered NOMA applications with a pair of WDs in each cluster, or have proposed NOMA clustering methods which do not take into account the effects of such correlations.

One or more embodiments described herein solve one or more problems with existing system at least in part by providing method and system for unsupervised user clustering and power allocation in non-orthogonal multiple access (NOMA)-aided massive multiple input-multiple output (MIMO) networks.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

As used herein, a "radio node" is either a radio access node or a wireless device.

As used herein, a "radio access node" or "radio network node" is any node in a radio access network of a cellular communications network that operates to wirelessly transmit and/or receive signals. Some examples of a radio access node include, but are not limited to, a network node (e.g., a New Radio (NR) network node (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

As used herein, a "network node" is any node that is either part of the radio access network or the core network of a cellular communications network/system.

As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP Technical Standard (TS) 38.211 V15.1.0 (2018-03) and 3GPP TS 38.214 V15.1.0 (2018-03), for example) may be understood to refer to the specific version(s) of such standard(s) that is (were) current at the time the present application was filed, and may also refer to applicable counterparts and successors of such versions.

The description herein focuses on a 3GPP cellular communications systems and, as such, 3GPP terminology or terminology similar to 3GPP terminology is oftentimes used. However, the concepts disclosed herein are not limited to a 3GPP system.

Figure 1:
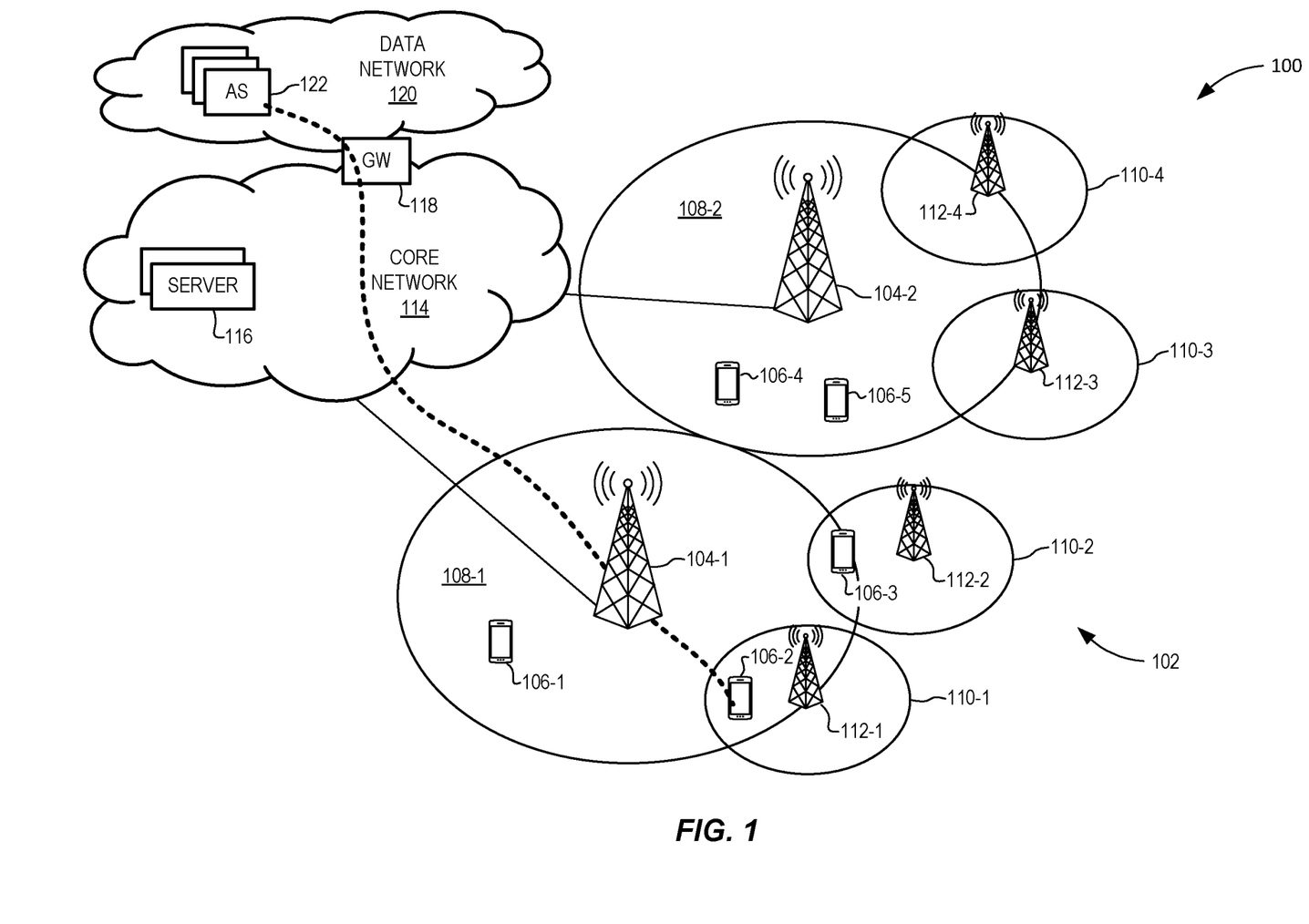
FIG. 1 is a block diagram schematically illustrating a representative network in which some embodiments disclosed herein may be deployed.

Referring now to the drawing figures, where like reference numerals denote like elements, FIG. 1 illustrates one example of a cellular communications network 100 in which embodiments of the present disclosure may be implemented. In some embodiments described herein, the cellular communications network 100 is a Public Land Mobility Network (PLMN) conforming to one or more of the LTE, 3G, 4G and 5G NR standards, or their successors. However, the principles disclosed herein are applicable to other wireless communication systems. In the illustrated example, the cellular communications network 100 includes a (Radio) Access Network (RAN) 102 comprising network nodes 104-1 and 104-2 controlling radio communications with wireless devices 106-1, 106-2, 106-3, 106-4,106-5 within corresponding macro cells 108-1 and 108-2. Each macro cell 108 may be defined by any suitable combination of geography, frequency, Radio Access Technology (RAT) and modulation scheme.

Network nodes 104 can be any type of network access device capable of establishing radio connection(s) with one or more wireless devices 106 within a respective coverage area of the network node 104 or low power node 112, and further configured to forward subscriber traffic between the core network 114 and the one or more wireless devices 106. An feature of a network node 104 is that it is configured with both a radio interface configured to send and receive radio signals to and from a wireless device 106, and a network interface configured to exchange electronic and/or optical signals with the core network 114. Examples of network nodes 104 and low power nodes 112 include: Evolved Node B (eNB) systems (known, for example, in the 3GPP standards): WiFi access points (known, for example from IEEE 802.11 standards) or the like. In some contexts, a network node 104 may be referred to as an access point (AP) regardless of the Radio Access Technology (RAT) that it supports.

The illustrated RAN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the network nodes 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. A feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a network node 104. Examples of low power nodes 112 include Remote Radio Heads (RRHs) connected to a network node or a network router (not shown), WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a network node 104, for example using a beam-forming technique. In such cases, the particular small cell 110 will not be associated with a respective low power node 112 per se. Rather, the particular small cell 110 will be associated with a respective set of parameters implemented in the network node 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices to enable a wireless device 106 to access those communication services.

Wireless devices 106 can be any type of device capable of sending and receiving radio signals to and from a network node 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding network nodes 104 and/or low power nodes 112.

In the example of FIG. 1, the RAN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and RAN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
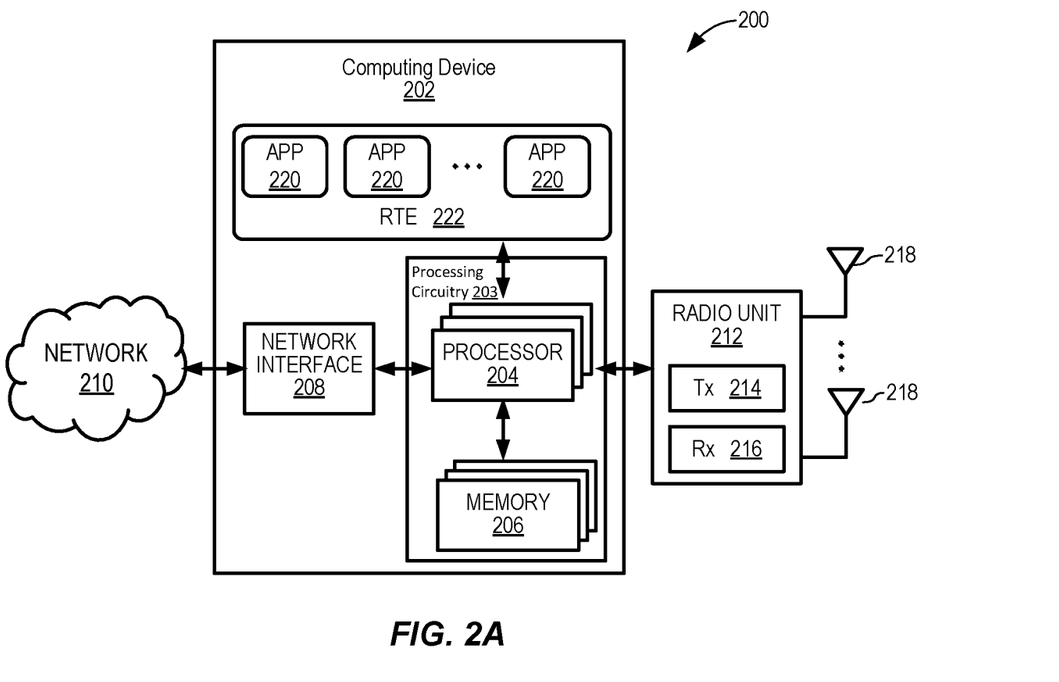
FIGS. 2A and 2B are block diagrams schematically illustrating examples of a computing device usable in some embodiments disclosed herein.
Figure 2B:
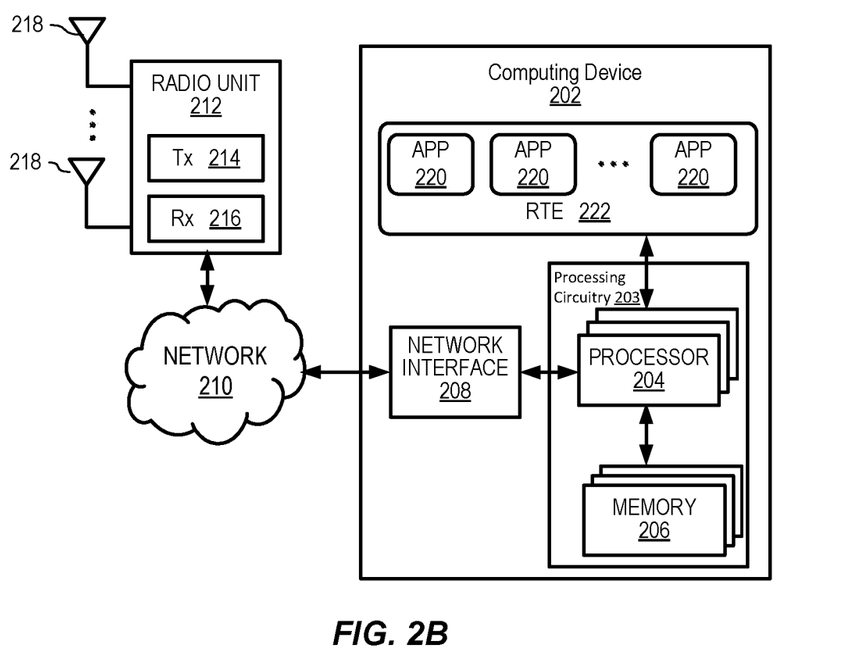

FIGS. 2A and 2B are block diagrams schematically illustrating a communications system 200 including a computing device 202 usable in some embodiments described herein. In various embodiments, any or all of the network nodes 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the network nodes 104 or 112, core network servers 116 or gateways 118, and/or any or all network functions may be implemented by suitable software executing within a computing device 202 or within a data center (not shown) composed of multiple computing devices 202.

In the example of FIG. 2A, the communications system 200 generally includes computing device 202 connected to one or more networks 210 and one or more radio units 212. The computing device 202 includes processing circuitry 203 such as one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 202 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

Some embodiments may exclude one or more of the elements illustrated in FIGS. 2A and 2B. For example, a computing device 202 configured to implement a wireless device 106 may incorporate processing circuitry 203 including one or more processors 204, a memory 206, and one or more radio units 212, but may exclude a network interface 208. Conversely, a computing device 202 configured to implement a server 116 or 122 may include processing circuitry 203 including one or more processors 204, a memory 206, and one or more network interfaces 208, but may exclude radio units 212. A computing device 202 configured to implement a network node 104 or 112, on the other hand, will normally include processing circuitry 203 including one or more processors 204, a memory 206, and both radio units 212 and network interfaces 208.

Figure 3:
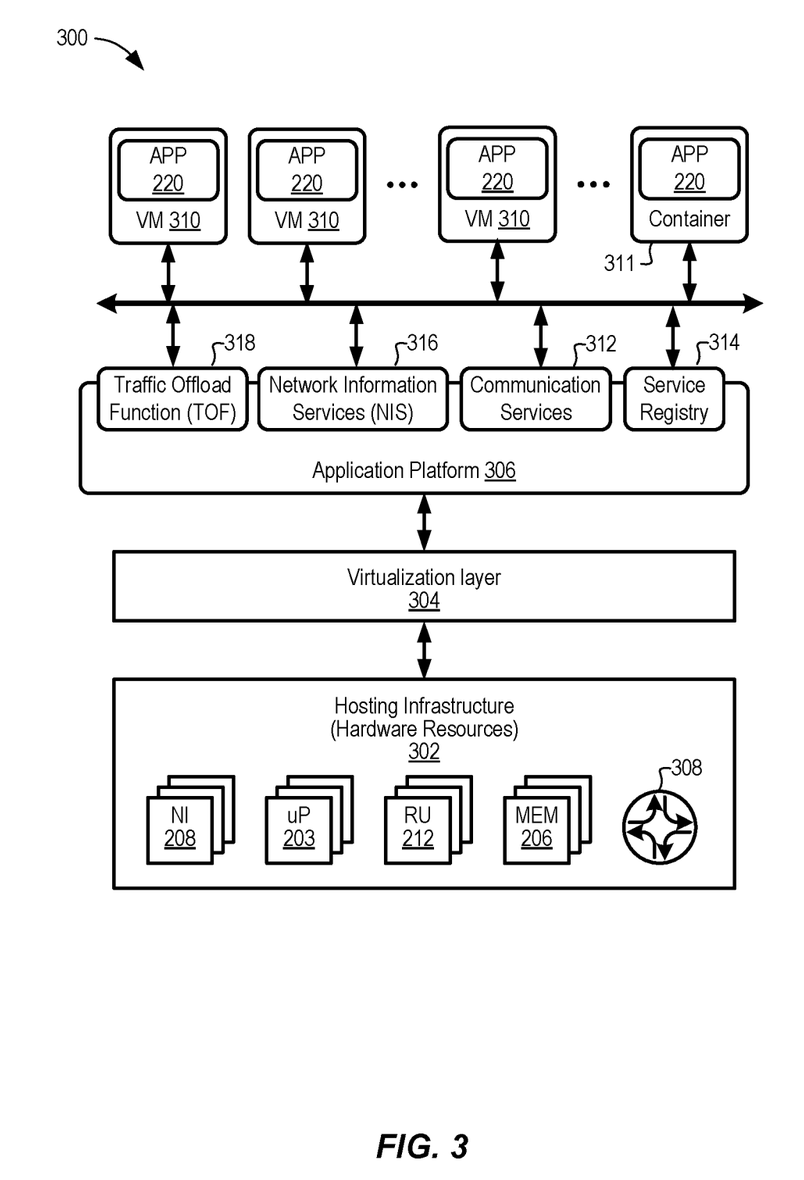
FIG. 3 is a block diagram schematically illustrating an architecture of a representative network element virtualization usable in some embodiments disclosed herein.

FIG. 3 is a block diagram schematically illustrating an example architecture for network element virtualization usable in some embodiments described herein. It is contemplated that the network elements may be physically implemented using one or more computers, data storage devices and routers (any or all of which may be constructed in accordance with the system 200 described above with reference to FIGS. 2A and/or 2B) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

The architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIGS. 2A and/or 2B, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions (for example as part of a WD plane function) may be presented with an abstraction of the hardware resources 302 (e.g. processor(s) 204, memory 206 and routing hardware 308) that may simplify the implementation of traffic forwarding policies. Similarly, an application that provides data storage functions may be presented with an abstraction of the hardware resources 302 (e.g. processor(s) 204 and memory 206) that facilitates the storage and retrieval of data (for example using Lightweight Directory Access Protocol—LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the application platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A service registry 314 may provide visibility of the services available on the computing device 202. In addition, the service registry 314 may present service availability (e.g. status of the service) together with the related interfaces and versions. This may be used by applications 220 to discover and locate the end-points for the services they require, and to publish their own service end-point for other applications to use.

Network Information Services (NIS) 316 may provide applications 220 with low-level network information pertaining to a network service instance or one or more packet data unit (PDU) sessions, for example. For example, the information provided by NIS 316 may be used by an application 220 to calculate and present relevant data (such as: cell-ID, location of the subscriber, cell load and throughput guidance) to session, access and policy control functions, any or all of which may themselves be implemented by applications 220 executing in respective VMs 310 or containers 311.

A Traffic Off-Load Function (TOF) service 318 may prioritize traffic, and route selected, policy-based, data streams to and from applications 220.

Systems and methods are disclosed herein that provide a learning-based WD 106 clustering algorithm to effectively integrate NOMA with transmit beamforming for downlink transmissions in both co-located and distributed massive MIMO networks. Clustering WDs 106 based on their channel correlation features, some methods described herein include automatically deciding whether to group the WDs 106 into NOMA clusters, or to serve the WDs 106 by using the available degree of freedom provided by the available antenna dimension in the system. As a result, some methods disclosed herein can improve an otherwise poor performance of conventional massive MIMO systems when the propagation environment is at least partially correlated.

Based on the correlation among WD channels, the present clustering algorithm can automatically group multiple WDs 106 into several NOMA clusters. Massive MIMO systems in which the antennas are either situated in a co-located manner at one location, or distributed over a serving area are considered. Also disclosed is a power-efficient solution by minimizing the total transmit power consumed in the network subject to minimum-SINR requirements at the WDs 106 to jointly design the WD clustering and power allocation coefficients. Some embodiments include jointly determining the power allocation coefficients and WD clustering that seeks to minimize the total transmit power, while also being applicable in both co-located and distributed massive MIMO-NOMA systems.

Some embodiments include a three-step solution: (1) a machine-learning-based WD clustering method groups WDs 106 into clusters, (2) beamforming weights are determined, and (3) a power allocation optimization problem is solved based on the WD clusters and beamforming vectors. For WD clustering, a novel clustering algorithm based on the mean-shift algorithm is disclosed, where a metric is provided to measure the correlation among WD channel vectors to group the WDs 106 in an unsupervised fashion.

Some advantages of some embodiments may include one or more of the following:
  A low complexity solution for the joint problem of power allocation and WD clustering design which can be applied for both co-located and distributed massive MIMO-NOMA networks is disclosed;
  The disclosed NOMA clustering method may include an unsupervised learning algorithm that is able to automatically determine an optimal combination of the spatial dimension (via transmit beamforming), and power dimension (via NOMA), for multi-WD 106 transmissions based on the availability of degrees of freedom presented in the channels of the WDs 106. In some embodiments, the NOMA clustering method determines a number of clusters and the WD 106 association to each cluster. When the system lacks sufficient spatial dimensionality to separate WDs 106, in some embodiments, the clustering algorithm forms clusters of WDs 106, each cluster containing WDs 106 of highly correlated channels, and uses the power dimension via NOMA techniques to separate their data;

Moreover, some embodiments, advance efforts for green communication by minimizing or reducing the total transmit power. Some embodiments have low complexity and guarantee a certain quality of service (QoS) at the WDs 106 in terms of the received signal to interference plus noise ratio (SINR).

Figure 4:
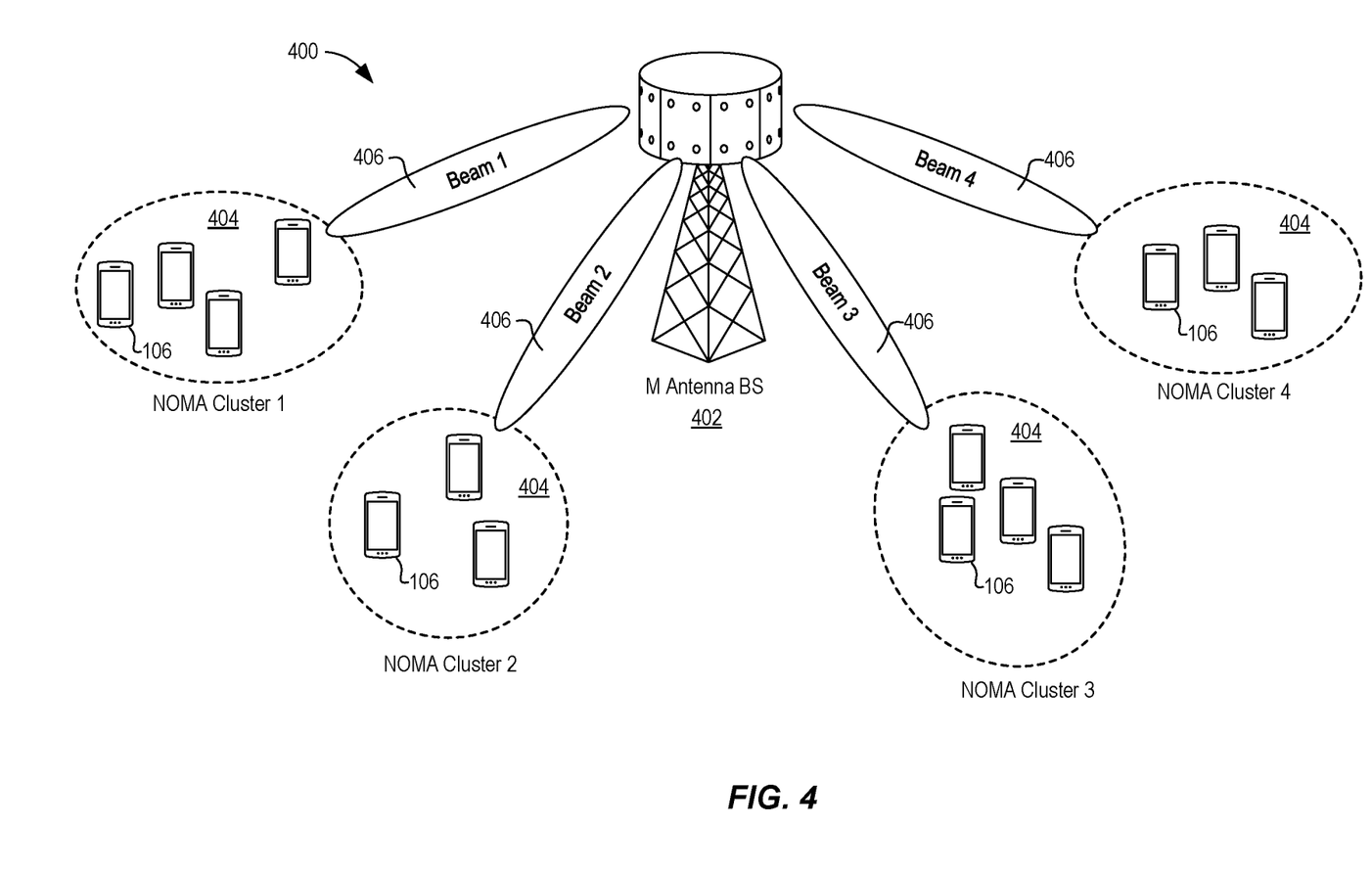
FIG. 4 illustrates a system in accordance with a representative embodiment of the present disclosure.

FIG. 4 is a block diagram illustrating an example NOMA-Aided massive MIMO network 400 in which a network node 402 is equipped with M (where M is an integer, greater than 1) co-located antennas (or an AAS with M antenna ports), and serves multiple WDs 106 106 which are grouped into one or more clusters 404. FIG. 4 shows four clusters 404 by way of example. Each cluster 404 is served by a separate beam 406 generated by the network node 402, and power-domain NOMA techniques may be used for downlink transmission to the WDs 106 within each cluster 404. Each network node 402 may be provided as any suitable type of radio access node capable of supporting M co-located antennas of an AAS with M antenna ports. Example network nodes 402 include eNBs and gNBs. User clustering, beamforming and power allocation may be done by a not-shown computing device 202 at the network node 402 or at a not-shown remote server (such as, for example, a server connected to the network node 402 through a back-haul connection or a virtual server in a cloud computing environment) associated with the network node 402.

Figure 5:
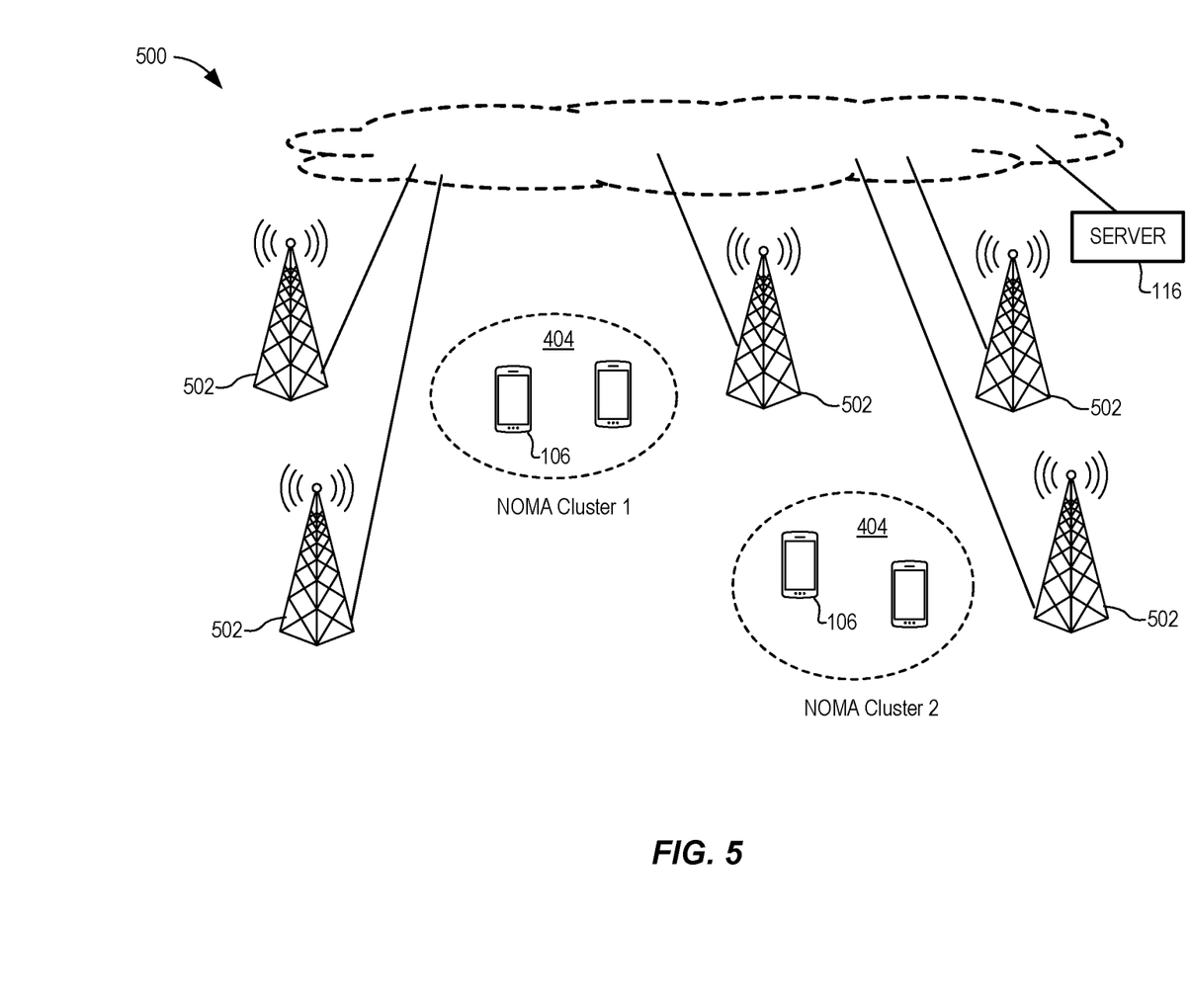
FIG. 5 illustrates a system in accordance with another representative embodiment of the present disclosure.

FIG. 5 is a block diagram illustrating a second example NOMA-Aided massive MIMO network 500 in which M single-antenna access point (AP) nodes 502 are controlled to simultaneously serve multiple single antenna WDs 106. In FIG. 5, a set of five AP nodes 502 serve four WDs 106 distributed into two clusters 404, by way of example. Each AP node 502 may be provided as any suitable type of radio access node. User clustering, beamforming and power allocation are done by a computing device 202 that may be co-located with one of the AP nodes 502, distributed across some or all of the AP nodes 502, or at a remote server 116 (such as, for example, a server connected to the AP nodes through a back-haul connection or a virtual server in a cloud computing environment) associated with the set of AP nodes 502. This configuration can be considered as a NOMA-aided cell-free massive MIMO network, or a device-to-device (D2D) communications network.

The following characteristics are assumed to apply to the example embodiments of both FIGS. 4 and 5:

No direct link between transceivers (i.e. BS or AP nodes);
$K_t$ co-scheduled WDs 106 in the network, where $K_t \leq M$;
An M-antenna BS (or M antenna port AAS) in a co-located scenario (FIG. 4), or M access points in a distributed scenario (FIG. 5);
Users are grouped into R clusters with $K_r$ WDs 106 in cluster r, r={1, 2, . . . , R};
Downlink transmission;
Channel state information (CSI) knowledge. That is, the network node or AP nodes have CSI information from the WDs 106; and
Channel reciprocity applies for each WD channel.

An objective of some embodiments is to minimize the total transmit power subject to quality of service (QoS) constraints on users' data rate represented by signal to noise ratio. Thus, the joint optimization problem may be formulated in equation (1) as follows:

$$\min_{R,\{K_r\},\{w_r\},p} \quad \sum_{k=1}^{K_t} p_k \quad (1)$$

$$\text{subject to: } \Gamma_k^k \geq \gamma_k, \quad k \in \mathcal{K}$$

$$\Gamma_k^j \geq \Gamma_j^j, \quad j > k, j, k \in \mathcal{K}_r, r \in \mathcal{R}$$

$$p_k \geq 0, \quad k \in \mathcal{K}$$

$$|\mathcal{K}_r| \geq 1, \quad r \in \mathcal{R}$$

$$\mathcal{K}_r \cap \mathcal{K}_j = \emptyset, \quad r \neq j, r, j \in \mathcal{R}$$

$$\sum_{r=1}^{R} |\mathcal{K}_r| = K_t$$

where:
$\mathcal{R} \triangleq \{1, 2, \ldots, R\}$ as the cluster index set;
$\mathcal{K} = \{1, 2, \ldots, K_t\}$ WD index set;
$\mathcal{K}_r$ as the index set of WDs 106 that belong to cluster r;
$w_r \triangleq [w_{r1}, w_{r2}, \ldots, w_{rM}]^T$ as the beamforming vector, where $w_{rm}$ is the complex weight coefficient at $AP_m$ for cluster r;
$p \triangleq [p_1, \ldots, p_{K_t}]^T$ as the power allocation vector where $p_k$ denotes the total power from all APs allocated to $WD_k$;
$\gamma_k$ as the SINR requirement at $UE_k$;
$\Gamma_k^k$ as the instantaneous SINR after the SIC operation at $WD_k$ to detect symbol $s_k$;

$$\Gamma_k^k = \frac{p_k |w_r^H h_k|^2}{1 + |w_r^H h_k|^2 \sum_{j \in \mathcal{K}_r, j<k} p_j + \sum_{r' \neq r} |w_{r'}^H h_k|^2 \sum_{j \in \mathcal{K}_{r'}} p_j};$$

$h_k \triangleq [h_{1k}, \ldots, h_{Mk}]^T$ as channel vector from all APs to $WD_k$, where $h_{mk}$ denotes the complex channel coefficient at $AP_m$ to $WD_k$;
$\Gamma_k^j$ as the instantaneous SINR before the SIC operation at $WD_k$ to decode the symbol intended for $WD_j$; and $$\Gamma_k^j = \frac{p_j |w_r^H h_k|^2}{1 + |w_r^H h_k|^2 \sum_{k' \neq k, k' \in \mathcal{K}_r} p_{k'} + \sum_{r' \neq r} |w_{r'}^H h_k|^2 \sum_{k' \in \mathcal{K}_{r'}} p_{k'}},$$

$$\forall k, j \in \mathcal{K}_r, r \in R.$$

The optimization problem in equation (1) is a mixed-integer program. The SINR expression is non-convex with respect to $\{w_r\}$ and p. This joint optimization problem may be very challenging to solve. An optimal solution may be found through an exhaustive search at the cost of great complexity, or a suboptimal solution may be obtained using heuristic methods at the cost of diminished accuracy.

Figure 6:
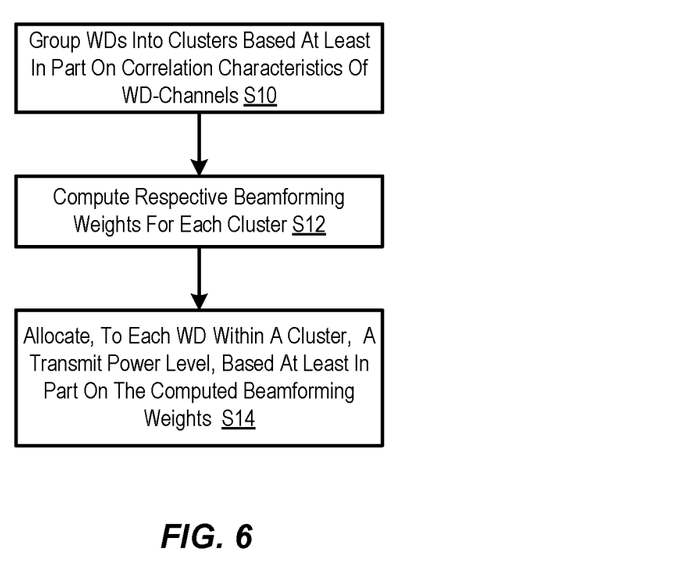
FIG. 6 is a flowchart illustrating a method in accordance with a representative embodiment of the present disclosure.

In some embodiments, the problem in equation (1) can be made more tractable by considering a specific type of beamforming method and decomposing the joint optimization problem into two subproblems, namely: the clustering subproblem; and the power allocation subproblem. Referring to FIG. 6, the present disclosure addresses the two subproblems using the following three-step procedure:

Step 1: Group WDs 106 into clusters based at least in part on correlation characteristics of WD-channels. A fast WD clustering algorithm based at least in part on an unsupervised machine-learning technique, utilizing the correlation characteristics of the WD channels, may be used (Block S10).

Step 2: Compute respective beamforming weights for each cluster (Block S12).

Step 3: Allocate to each WD within a cluster, a transmit power level, based at least in part on the computed beamforming weights (Block S14). For the clustering solution and the beamforming method, the minimization problem in Equation (1) may be reformulated into a linear programming problem for power allocation optimization within each cluster.

Each of these steps is described in greater detail below:
1) Grouping WDs 106 into Clusters In some embodiments, a machine-learning-based clustering algorithm may be used, which utilizes the correlation among WDs' channel vectors, $\{h_k\}_{k=1}^{K_t}$, to form a metric to make the WD clustering decision. The channel vectors $\{h_k\}_{k=1}^{K_t}$ may be derived from the CSI information obtained from each WD using known methods.

It is known that with multi-antenna transmitters, the spatial dimension can be explored to separate data from multiple WDs 106. However, in a correlated propagation environment, WD channels may be highly correlated. This limits the degrees of freedom that can be explored at the transmitter(s) to minimize interference among WDs 106. As a result, only relying on transmit beamforming may result in poor performance. To address this, for WDs 106 with highly correlated channels, NOMA techniques may be used among the WDs 106 in a given cluster to use the power dimension to separate their data. An advantage of this method is the ability to automatically switch between using the spatial dimension (via transmit beamforming), and power dimension (via NOMA), for multi-UE transmission based on the availability of degrees of freedom present in the system. When the system lacks sufficient spatial dimensionality to separate WDs 106, the clustering algorithm may form clusters of WDs 106, each of which contains WDs 106 of highly correlated channels and uses the NOMA technique to separate their data. The number of clusters R and WDs 106 in each cluster $K_r$, may be automatically selected depending on the degrees of freedom available among WDs 106.

The design of an effective unsupervised machine-learning clustering algorithm may depend on the data vector space (i.e., feature space) used to partition the WDs 106 into various clusters. The correlation among channels is an indicator of the degrees of freedom, and thus, the transmit beamforming performance of the system. A feature space may be spanned based on normalized complex-valued channel vectors, i.e., $$x_k = \frac{h_k}{\|h_k\|}$$

for $k \in \mathcal{K}$. WDs 106 may then be grouped into clusters based on how correlated their channels are. Subsequently, NOMA techniques may be used within each cluster to separate WDs 106 using the power dimension and to overcome the limitation of spatial dimension for WD separation due to channel correlation in the conventional SD-MIMO systems. Specifically, correlated WDs 106 inside each cluster perform a Successive Interference Cancellation (SIC) operation to remove intra-cluster interference from other WDs 106 with weaker channels.

Principal steps of some embodiments of a mean-shift clustering algorithm are summarized as follows:

Step 1: Define each data point as $$x_k = \frac{h_k}{\|h_k\|} e^{-j \angle h_{1k}}$$

for $k \in K$; let $\mathcal{X} = \{x_k, k \in \mathcal{K}\}$; set the correlation threshold $\tau \in (0, 1]$; set the iteration threshold $\epsilon$.

Step 2: Let $\mathcal{T} \subseteq \mathcal{X}$ denote the cluster center. Initialize $\mathcal{T} = \mathcal{X}$, and set r=1.

Step 3: Set l=0, and randomly select a centroid point $t_r^{(l)} \in \mathcal{T}$.

Step 4: Obtain the set of data points associated to cluster r, such that $\mathcal{X}_r = \{x_k : |t_r^H x_k| > \tau, \forall x_k \in \mathcal{X}\}$.

Step 5: For all $x_k \in \mathcal{X}_r$, calculate $$t_r^{(l+1)} = \frac{\sum_{x_k \in \mathcal{X}_r} x_k f\left(\frac{1 - |t_r^{(l)H} x_k|}{1 - \tau}\right)}{\sum_{x_k \in \mathcal{X}_r} f\left(\frac{1 - |t_r^{(l)H} x_k|}{1 - \tau}\right)}, \quad (1)$$

and $$t_r^{(l+1)} \leftarrow \frac{t_r^{(l+1)}}{\|t_r^{(l+1)}\|}.$$

Step 6: If $|t_r^{(l)} - t_r^{(l+1)}| > \epsilon$, set $l \leftarrow l+1$, and repeat the above steps from Step 4; Otherwise, proceed to Step 7.

Step 7: Update $\mathcal{T}$ such that $\mathcal{T} \leftarrow \mathcal{T} \setminus \mathcal{X}_r$, i.e., in each iteration $\mathcal{T}$ is updated by removing $\mathcal{X}_r$ from $\mathcal{T}$ calculated in the previous iteration. If $\mathcal{T} \neq \emptyset$, then set $r \leftarrow r+1$ and repeat the above steps from Step 5. Repeat until $\mathcal{T} = \emptyset$.

2) Computing Beamforming Weights.

In some embodiments a zero-forcing (ZF) beamforming scheme may be used to determine beamforming weights $\{w_r\}$ that suppress the inter-cluster interference. ZF beamforming may nullify the interference among clusters by projecting the received signal onto the interference null space. Since a respective single beam is used for each cluster, to effectively design the ZF beamformer, the desired beam may be formed using the centroid $t_r$ in each cluster r, and project it into the interference null space. The ZF beamforming vector is given by the equation (2):

$$w_r^{ZF} = \frac{P_r t_r}{\|P_r t_r\|}, \quad \text{for } r \in \mathcal{R}. \quad (2)$$

where
$P_r \triangleq Q''_r (Q''^H_r Q''_r)^{-1} Q''^H_r$
$Q''_r \in \mathbb{C}^{M \times T}$ is the basis matrix of the null space of $H_{-r}$ obtained by QR-decomposition as follows:

$$H_{-r} = Q_r R_r = [Q'_r \ Q''_r] \begin{bmatrix} R'_r \\ 0 \end{bmatrix}$$

$H_{-r} \triangleq [H_1, \ldots, H_{r-1}, H_{r+1}, \ldots, H_R] \in \mathbb{C}^{M \times (K_t - K_r)}$, with $H_r \in \mathbb{C}^{M \times K_r}$, denoting a channel matrix whose columns are the collection of WD channels in the cluster r.

Alternatively, other beamforming methods can be used to determine beamforming weights $\{w_r\}$. For example, a maximum ratio transmission (MRT) beamforming design can be used as follows:

$$w_r^{MRT} = \frac{t_r}{\|t_r\|}, \text{ for } r \in \mathcal{R}$$

3) Allocating Power Levels to WDs 106 within Each Cluster.

Given the clustering solution $\{\mathcal{K}_r\}_r^R$ and beamforming weights $\{w_r\}_r^R$ for each cluster r, the power allocation optimization problem in equation (1) above can be reformulated as the following power minimization problem:

$$\min_{\{p_k\}} \quad \sum_{k=1}^{K_t} p_k \tag{3}$$

$$\text{subject to:} \quad \Gamma_k^k \geq \gamma_k, \quad k \in \mathcal{K}$$

$$\Gamma_k^j \geq \Gamma_j^j, \quad j > k, j, k \in \mathcal{K}_r, r \in \mathcal{R}$$

$$p_k \geq 0, \quad k \in \mathcal{K}$$

Since both the objective and constraint functions in this minimization problem are linear with respect to power variables $\{p_k\}$, the problem is a linear programming (LP) problem and can be solved using LP techniques such as dual-simplex or interior-point algorithms.

Figure 7:
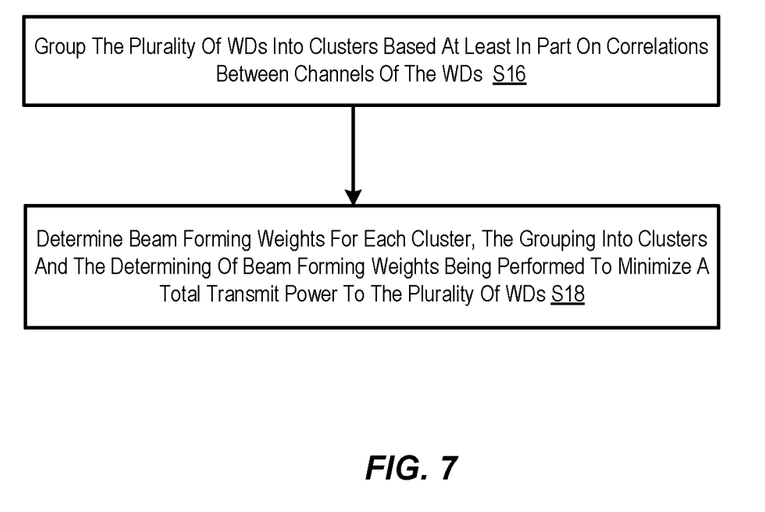
FIG. 7 is a flowchart of an example process for grouping WDs into clusters and beamforming to the clusters subject to power constraints.

FIG. 7 is a flowchart of an example process for grouping WDs 106 into clusters and beamforming to the clusters subject to power constraints. The process may be performed by the network node 402 including processing circuitry 203, processor 204 and memory 206. The process includes grouping the plurality of WDs 106 into clusters based at least in part on correlations between channels of the WDs 106 (Block S16). The process also includes determining beam forming weights for each cluster, the grouping into clusters and the determining of beam forming weights being performed to minimize a total transmit power to the plurality of WDs 106 (Block S18).

In some embodiments, the process also includes determining a power allocated to each WD 106 of the plurality of WDs 106 that minimizes the total transmit power. In some embodiments, the grouping of the plurality of WDs 106 into clusters is performed by an unsupervised machine learning process. In some embodiments, the unsupervised machine learning process is configured to maximize a total number of users in each group cluster based at least in part on the correlations. In some embodiments, the unsupervised machine learning process includes a mean-shift algorithm. In some embodiments, the correlations between the channels are derived from channel state information, CSI, that is one of reported by the plurality of WDs 106 and estimated by the network node 402.

In some embodiments, beam forming weights for a cluster are determined based at least in part on a centroid of a function of channel state information, CSI, for the WDs 106 in the cluster. In some embodiments, beam forming weights for a cluster are determined based at least in part on a zero-forcing process. In some embodiments, the process also includes allocating power to WDs 106 within a cluster by application of a non-orthogonal multiple access, NOMA, sequential interference cancellation, SIC, process. In some embodiments, the grouping of the plurality of WDs 106 into clusters and the allocating of power to the WDs 106 within a cluster are performed subject to constraints on signal to interference plus noise ratios, SINRs, measured at each WD of the plurality of WDs 106. In some embodiments, the grouping into clusters and the determining of beam forming weights for each cluster is performed in a distributed massive multiple input multiple output, MIMO, non-orthogonal multiple access, NOMA, architecture. In some embodiments, the grouping into clusters and the determining of beam forming weights for each cluster is performed in a collocated massive multiple input multiple output, MIMO, non-orthogonal multiple access, NOMA, architecture.

Based on the foregoing description, some examples are as follows:

1. A method of managing wireless devices 106 (e.g., user equipments (UEs)) in a network, the method comprising:

grouping WDs 106 into clusters based at least in part on correlation characteristics of WD-channels;

computing respective beamforming weights for each cluster; and allocating, to each WD 106 within a given cluster, a transmit power level, based at least in part on the computed beamforming weights.

2. The method of example 1, wherein grouping WDs 106 is performed by an unsupervised machine learning algorithm.

3. The method of example 1, wherein the correlation characteristics of WD-channels is derived from CSI information obtained from each WD 106.

4. The method of example 1, wherein computing beamforming weights comprises using a Zero-Forcing beamforming algorithm to compute the beamforming weights.

5. The method of example 4, wherein the Zero-Forcing beamforming algorithm uses a centroid of the cluster to compute the beamforming weights for that cluster.

6. The method of example 1, wherein allocating the transmit power level comprises allocating the transmit power level to each WD within a given cluster in accordance with a NonOrthogonal Multiple Access (NOMA) Sequential Interference Cancellation (SIC) scheme.

7. A network node 402 configured to perform the method of any one or more of examples 1-6.

While processes in the figures may show a particular order of operations performed by certain embodiments of the present disclosure, it should be understood that such order is representative, and that alternative embodiments may perform the operations in a different order, combine certain operations, overlap certain operations, etc. As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

At least some of the following abbreviations and terms may be used in this disclosure.

2D Two Dimensional
3GPP Third Generation Partnership Project
5G Fifth Generation
AAS Antenna Array System
AoA Angle of Arrival
AoD Angle of Departure
AP Access Point
ASIC Application Specific Integrated Circuit
BF Beamforming
BLER Block Error Rate
BS Base Station
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Network node
ICC Information Carrying Capacity
IIR Infinite Impulse Response
LoS Line-of-Sight
LTE Long Term Evolution
MIMO Multiple Input Multiple Output
MME Mobility Management Entity
MMSE Minimum Mean Square Error
MTC Machine Type Communication
NLoS Non-Line-of-Sight
NOMA Non-Orthogonal Multiple Access
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal-to-Interference-plus-Noise Ratio
TBS Transmission Block Size
UE User Equipment
ULA Uniform Linear Array
URA Uniform Rectangular Array
ZF Zero-Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method in a network node configured to communicate wirelessly with a plurality of wireless devices, WDs, the method comprising:
grouping the plurality of WDs into clusters based at least in part on correlations between channels of the WDs; and
determining beam forming weights for each cluster, the grouping into clusters and the determining of beam forming weights being performed to minimize a total transmit power to the plurality of WDs,
wherein the grouping of the plurality of WDs into clusters is performed by an unsupervised machine learning process, wherein the unsupervised machine learning process includes a mean-shift algorithm.

2. The method of claim 1, further comprising determining a power allocated to each WD of the plurality of WDs that minimizes the total transmit power.

3. The method of claim 1, wherein the unsupervised machine learning process is configured to maximize a total number of users in each group cluster based at least in part on the correlations.

4. The method of claim 1, wherein the correlations between the channels are derived from channel state information, CSI, that is one of reported by the plurality of WDs and estimated by the network node.

5. The method of claim 1, wherein beam forming weights for a cluster are determined based at least in part on a centroid of a function of channel state information, CSI, for the WDs in the cluster.

6. The method of claim 1, wherein beam forming weights for a cluster are determined based at least in part on a zero-forcing process.

7. The method of claim 1, further comprising allocating power to WDs within a cluster by application of a non-orthogonal multiple access, NOMA, sequential interference cancellation, SIC, process.

8. The method of claim 7, wherein the grouping of the plurality of WDs into clusters and the allocating of power to the WDs within a cluster are performed subject to constraints on signal to interference plus noise ratios, SINRs, measured at each WD of the plurality of WDs.

9. The method of claim 1, wherein the grouping into clusters and the determining of beam forming weights for each cluster is performed in a distributed massive multiple input multiple output, MIMO, non-orthogonal multiple access, NOMA, architecture.

10. The method of claim 1, wherein the grouping into clusters and the determining of beam forming weights for each cluster is performed in a collocated massive multiple input multiple output, MIMO, non-orthogonal multiple access, NOMA, architecture.

11. A network node configured to communicate wirelessly with a plurality of wireless devices, WDs, the network node comprising processing circuitry configured to:
group the plurality of WDs into clusters based at least in part on correlations between channels of the WDs; and
determine beam forming weights for each cluster, the grouping into clusters and the determining of beam forming weights being performed to minimize a total transmit power to the plurality of WDs,
wherein the grouping of the plurality of WDs into clusters is performed by an unsupervised machine learning process, wherein the unsupervised machine learning process includes a mean-shift algorithm.

12. The network node of claim 11, wherein the processing circuitry is further configured to determine a power allocated to each WD of the plurality of WDs that minimizes the total transmit power.

13. The network node of claim 11, wherein the unsupervised machine learning process is configured to minimize the total transmit power to the plurality of WDs.

14. The network node of claim 11, wherein the correlations between the channels are derived from channel state information, CSI, reported by the plurality of WDs.

15. The network node of claim 11, wherein beam forming weights for a cluster are determined based at least in part on a centroid of the cluster.

16. The network node of claim 11, wherein beam forming weights for a cluster are determined based at least in part on a zero-forcing process.

17. The network node of claim 11, wherein the processing circuitry is further configured to allocate power to WDs within a cluster by application of a non-orthogonal multiple access, NOMA, sequential interference cancellation, SIC, process.

18. The network node of claim 11, wherein the grouping of the plurality of WDs into clusters and the allocating of power to the WDs within a cluster are performed subject to constraints on signal to interference plus noise ratios, SINRs, measured at each WD of the plurality of WDs.

19. The network node of claim 11, wherein the grouping into clusters and the determining of beam forming weights for each cluster is performed in a distributed massive multiple input multiple output, MIMO, non-orthogonal multiple access, NOMA, architecture.

20. The network node of claim 11, wherein the grouping into clusters and the determining of beam forming weights for each cluster is performed in a collocated massive multiple input multiple output, MIMO, non-orthogonal multiple access, NOMA, architecture.

21. A method in a network node configured to communicate wirelessly with a plurality of wireless devices, WDs, the method comprising:
grouping the plurality of WDs into clusters based at least in part on correlations between channels of the WDs; and
determining beam forming weights for each cluster, the grouping into clusters and the determining of beam forming weights being performed to minimize a total transmit power to the plurality of WDs,
wherein beam forming weights for a cluster are determined based at least in part on a centroid of a function of channel state information, CSI, for the WDs in the cluster.

* * * * *